United States Patent
Syed et al.

(10) Patent No.: US 8,442,711 B2
(45) Date of Patent: May 14, 2013

(54) HYBRID VEHICLE AND METHOD OF CONTROL FOR ENGINE TRANSIENT MITIGATION

(75) Inventors: Fazal Urrahman Syed, Canton, MI (US); Qing Wang, Canton, MI (US); Carol Louise Okubo, Belleville, MI (US); Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 13/007,700

(22) Filed: Jan. 17, 2011

(65) Prior Publication Data

US 2012/0185117 A1   Jul. 19, 2012

(51) Int. Cl.
*B60L 11/00* (2006.01)

(52) U.S. Cl.
USPC ......................................... 701/22; 180/65.28

(58) Field of Classification Search .................... 701/22, 701/70, 94, 111; 180/65.21, 65.1, 65.28, 180/65.285; 477/3
See application file for complete search history.

(56) References Cited

U.S. PATENT DOCUMENTS

| | | | |
|---|---|---|---|
| 6,480,767 B2 | 11/2002 | Yamaguchi et al. | |
| 7,273,439 B2 | 9/2007 | Kuang et al. | |
| 7,275,610 B2 | 10/2007 | Kuang et al. | |
| 7,576,501 B2 | 8/2009 | Okubo et al. | |
| 7,680,567 B2 | 3/2010 | Syed et al. | |
| 2006/0025906 A1 | 2/2006 | Syed et al. | |
| 2006/0030979 A1 | 2/2006 | Kuang et al. | |
| 2009/0118082 A1* | 5/2009 | Heap et al. | 477/5 |
| 2010/0017054 A1* | 1/2010 | Okubo et al. | 701/22 |
| 2010/0023194 A1 | 1/2010 | Okubo et al. | |
| 2010/0299009 A1* | 11/2010 | Falkenstein | 701/22 |

FOREIGN PATENT DOCUMENTS

JP          11336581 A       12/1999

OTHER PUBLICATIONS

Science Direct, Hybrid feedback stabilization of systems with quantized signals, http://www.sciencedirect.com, May 20, 2010.
Science Direct, Nonlinear Analysis: Optimal persistent disturbance attenuation control for linear hybrid, http://www.sciencedirect.com, May 20, 2010.

* cited by examiner

*Primary Examiner* — Thomas Tarcza
*Assistant Examiner* — Kevin Myhre
(74) *Attorney, Agent, or Firm* — David B. Kelley; Brooks Kushman P.C.

(57) ABSTRACT

A hybrid vehicle and method of control are associated with the following operation. A quantized previous engine power command based on a previous engine power command is obtained. A current engine power command is quantized. The quantized current engine power command is maintained if the magnitude of the difference between the current engine power command and the quantized previous engine power command is larger than a threshold. The quantized current engine power command is set equal to the quantized previous engine power command if the magnitude of the difference between the current engine power command and the quantized previous engine power command is smaller than the threshold. An output engine power command based on the quantized current engine power command is generated. An engine of the hybrid vehicle is operated based on the output engine power command.

20 Claims, 5 Drawing Sheets

HYBRID VEHICLE AND METHOD OF CONTROL FOR ENGINE TRANSIENT MITIGATION

BACKGROUND

1. Field of the Invention

The present invention relates to a hybrid vehicle and a method of control.

2. Background Art

FIG. 1 illustrates a block diagram of a conventional 'load-following' engine power determination architecture 10 for a hybrid electric vehicle. In conventional architecture 10, an engine power command 12 is determined as the sum of a driver power command 14 and a battery power command 16. As such, in conventional architecture 10, the engine directly responds to any change of driver power command 14.

Accordingly, in real-world driving, any chaotic and aggressive driver power command 14 can easily generate pertubation of engine power command 12. The pertubation can be reflected as power fast-fluctuations and dithering. Such transients adversely affect the engine combustion efficiency and cost extra transient fuel. Further, many engine control parameters are 'predicatively' scheduled based on the rate of change of engine power command 12. Therefore, engine power disturbance may cause other non-optimum engine settings and deteriorate fuel/air errors. Even if the A/F ratio can be kept within a moderate narrow range, the integration effect of the fuel enrichments caused by more frequently occurring transients can be magnified and accumulated up to a considerable level of fuel losses.

SUMMARY

In at least one embodiment, a method of operating a hybrid vehicle having an engine and a secondary power source is provided. The method includes: obtaining a quantized previous engine power command based on a previous engine power command; and quantizing a current engine power command. The quantized current engine power command is maintained if the magnitude of the difference between the current engine power command and the quantized previous engine power command is larger than a threshold. The quantized current engine power command is set equal to the quantized previous engine power command if the magnitude of the difference between the current engine power command and the quantized previous engine power command is smaller than the threshold. An output engine power command based on the quantized current engine power command is generated. The engine is operated based on the output engine power command.

In at least one embodiment, a hybrid vehicle is provided. The hybrid vehicle includes: an electrical machine; an engine and a secondary power source capable of supplying power to the electrical machine; and a controller. The controller is configured to: obtain a quantized previous engine power command based on a previous engine power command; quantize a current engine power command; maintain the quantized current engine power command if the magnitude of the difference between the current engine power command and the quantized previous engine power command is larger than a threshold; set the quantized current engine power command equal to the quantized previous engine power command if the magnitude of the difference between the current engine power command and the quantized previous engine power command is smaller than the threshold; generate an output engine power command based on the quantized current engine power command; and operate the engine based on the output engine power command.

In at least one embodiment, a method is provided. The method includes: obtaining a quantized previous power command based on a previous power command; and quantizing a current power command. The quantized current power command is maintained if the magnitude between the current power command and the quantized previous power command is larger than a threshold and otherwise setting the quantized current power command equal to the quantized previous power command. An engine of a hybrid vehicle is operated based on the quantized current power command.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figure 1:
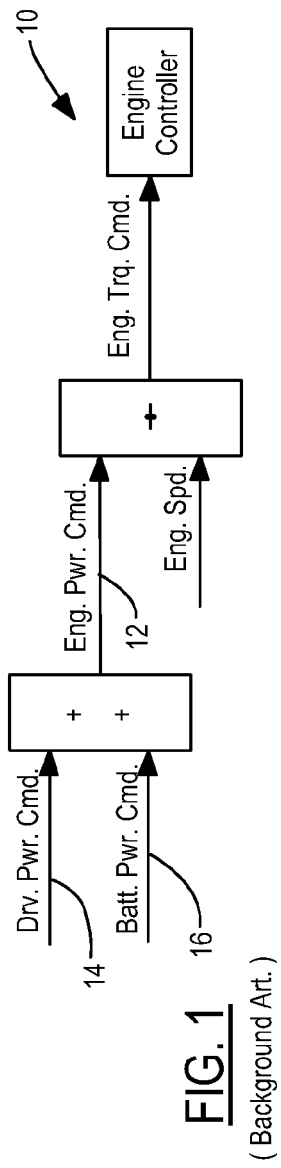
FIG. 1 illustrates a block diagram of a conventional 'load-following' engine power determination architecture for a hybrid electric vehicle.
Figure 2:
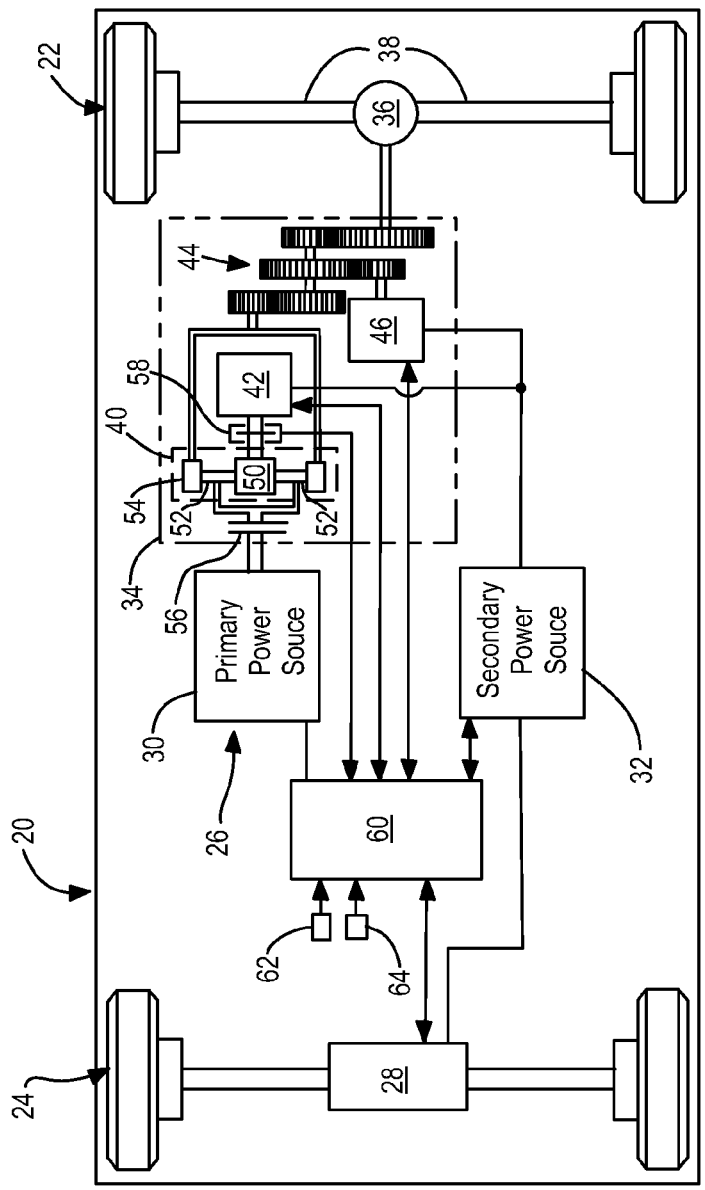
FIG. 2 illustrates a schematic of an exemplary hybrid vehicle.

Referring now to FIG. 2, a schematic of a hybrid vehicle 20 is shown. Hybrid vehicle 20 includes a first wheel set 22, a second wheel set 24, and a wheel drive system or drivetrain 26.

Drivetrain 26 may be configured to drive or actuate first and/or second wheel sets 22, 24. Drivetrain 26 may have any suitable configuration, such as a series drive, split hybrid drive, or dual mode split as is known by those skilled in the art. Drivetrain 26 has a power split drive configuration in the embodiment shown in FIG. 2.

Drivetrain 26 may be configured to drive or provide torque to first and/or second wheel sets 22, 24. In the embodiment shown, first wheel set 22 is configured to be driven by drivetrain 26 while second wheel set 24 is configured to be driven by an electrical machine 28, such as an electric motor. Alternatively, second wheel set 24 may be provided without electrical machine 28.

Hybrid vehicle 20 may include any suitable number of power sources. In the embodiment shown in FIG. 2, hybrid vehicle 20 includes a primary power source 30 and a secondary power source 32.

Primary power source 30 may be any suitable energy generation device, such as an internal combustion engine that may be adapted to combust any suitable type of fuel like gasoline, diesel fuel, or hydrogen.

Secondary power source 32 may be of any suitable type. For example, secondary power source 32 may be electrical, non-electrical, or combinations thereof. An electrical power source such as a battery, a battery pack having electrically interconnected cells, a capacitor, or a fuel cell may be utilized. If a battery is used it may be of any suitable type, such as nickel-metal hydride (Ni-MH), nickel-iron (Ni—Fe), nickel-cadmium (Ni—Cd), lead acid, zinc bromide (Zu—Br), or lithium based. If a capacitor is used it may be of any suitable type, such as an ultra capacitor, super capacitor, electro-chemical capacitor, or electronic double layer capacitor. A non-electrical power source may be a device whose energy may be converted to electrical or mechanical energy. For instance, a hydraulic power source or mechanical power source such as a flywheel, spring, engine, or compressed gases may store energy that may be converted or released as electrical or mechanical energy as needed. For simplicity, the description below will primarily refer to an embodiment of the present invention that incorporates an electrical power source.

Primary and secondary power sources 30, 32 may be adapted to provide power to a power transfer system 34 and/or electrical machine 28. Power transfer system 34 is adapted to drive one or more vehicle wheels. In at least one embodiment, power transfer system 34 may be connected to a differential 36 in any suitable manner, such as with a driveshaft, chain, or other mechanical linkage. Differential 36 may be connected to each wheel of first wheel set 22 by one or more shafts 38, such as an axle or half shaft.

Power transfer system 34 may include various mechanical, electrical, and/or electro-mechanical devices. In the embodiment shown, power transfer system 34 includes a planetary gear assembly 40, a first electrical machine 42, a power transfer unit 44, and a second electrical machine 46 as primary components.

Planetary gear assembly 40 may have any suitable configuration. In the embodiment shown, planetary gear assembly 40 includes a sun gear 50, a plurality of planet gears 52, and a ring gear 54.

Primary power source 30 may be selectively coupled to planetary gear assembly 40 via a clutch 56. Clutch 56 may be of any suitable type, such as a one way clutch that permits primary power source 30 to drive planetary gear assembly 40. If clutch 56 is engaged, primary power source 30 may rotate planet gears 52. Rotation of planet gears 52 may then rotate ring gear 54. Ring gear 54 may be coupled to power transfer unit 44 that is coupled to differential 36 for transmitting torque to vehicle wheels to propel hybrid vehicle 20. Power transfer unit 44 may include a plurality of gear ratios that may be engaged to provide a desired vehicle response.

First electrical machine 42, which may be a motor or motor-generator, may be coupled to sun gear 50 to provide a torque to supplement or counteract torque provided by primary power source 30. A brake 58 may be provided to reduce the speed and/or the transmission or torque from first electrical machine 42 to sun gear 50.

Second electrical machine 46 may be powered by secondary power source 32 and/or first electrical machine 42. Second electrical machine 46, which may be a motor, may be coupled to power transfer unit 44 to propel hybrid vehicle 20.

One or more controllers 60 may monitor and control various aspects of hybrid vehicle 20. For simplicity, a single controller 60 is shown; however, multiple controllers may be provided for monitoring and/or controlling the components, systems, and functions described herein.

Controller 60 may communicate with primary power source 30, secondary power source 32, and electrical machines 42, 46 to monitor and control their operation and performance. Controller 60 may receive signals indicative of engine speed, engine torque, vehicle speed, electrical machine speed, electrical machine torque, and operational state of secondary power source 32 in a manner known by those skilled in the art. For example, engine speed may be detected by an engine speed sensor adapted to detect the rotational speed or rotational velocity of an associated component. Such a speed sensor may be incorporated with primary power source 30 to detect the rotational speed or velocity of an output shaft of the primary power source. Alternatively, a speed sensor may be disposed in drivetrain 26 downstream of primary power source 30.

Controller 60 may receive input signals from other components or subsystems. For example, controller 60 may receive a signal indicative of vehicle acceleration that is requested by a driver or by a vehicle system, such as an active or intelligent cruise control system. Such a signal may be provided by or based on a signal from an input device or sensor 62, such as an accelerator pedal sensor or cruise control input device.

Controller 60 may also receive a signal indicative of vehicle deceleration that is requested by a driver or by a vehicle system, such as an active or intelligent cruise control system. Such a signal may be provided by or based on a signal from an input device or sensor 64, such as a brake pedal sensor or cruise control input device.

Acceleration and deceleration requests may be used to assess whether a "tip-in" event or a "tip-out" event has occurred. A tip-in event indicates that additional power or vehicle acceleration is demanded. A tip-out event indicates that less power or vehicle deceleration is demanded. For example, a tip-in event may be indicated by actuation of an accelerator pedal. Similarly, a tip-out event may be indicated by braking of the vehicle, lifting off an accelerator pedal, or combinations thereof.

In a hybrid vehicle, acceleration (tip-in) and deceleration (tip-out) events lead to a change in the power provided to actuate vehicle wheels. In general, an acceleration request increases power consumption demand and a deceleration request reduces power consumption demand. This change in power demand may result in a transient condition or state in which the operational characteristics of at least one power source are changed to provide an increased or reduced amount of power.

In a hybrid vehicle having an engine, the engine power may be a function of engine output torque and engine speed (e.g., power=torque*speed). During transient conditions, reduced fuel economy may occur if the engine torque and the engine speed are not intelligently controlled. Fuel economy shortcomings may be magnified by aggressive driving with more frequent tip-in and/or tip-out events. The present invention may help provide improved fuel economy as compared to existing methodologies by providing an improved method of control.

Figure 3:
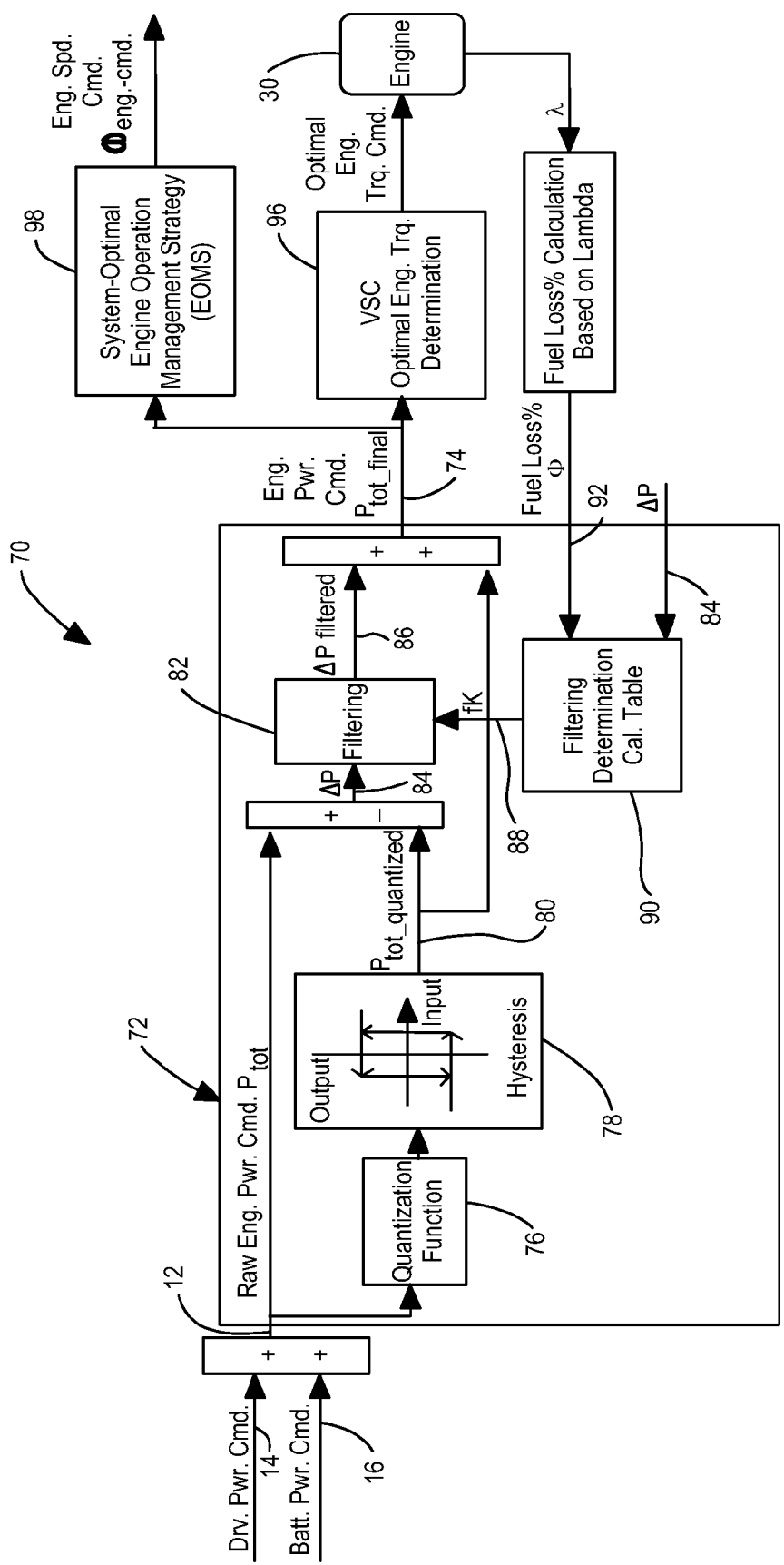
FIG. 3 illustrates a block diagram of an improved engine power determination architecture configured to implement a method of control for engine transient mitigation in a hybrid vehicle in accordance with an embodiment of the present invention.

Referring to FIG. 3, a block diagram of an improved engine power determination architecture 70 configured to implement a method of control for engine transient mitigation in a hybrid vehicle in accordance with an embodiment of the present invention is shown. Improved architecture 70 will be described with reference to an embodiment of a hybrid vehicle having an engine as a primary power source and a battery as a secondary source; however, it is to be understood that other primary and secondary power sources may be employed as described above in various embodiments.

The method of control for engine transient mitigation implemented by improved architecture 70 includes engine power command quantization and filtering processes. A goal of the engine transient mitigation method is to effectively smooth out the profile of the engine power command and let the battery power fill in the high frequency and chaotic component of the drive power.

Compared to conventional architecture 70, improved architecture 70 performs the following additional processes to profile engine power command: (i) an engine power command quantization with hysteresis process (described below with reference to FIG. 4); and (ii) a quantized engine power command filtering process (described below with reference to FIG. 5).

Improved architecture 70, which may be implemented in controller 60, includes an engine power command quantization and filtering module 72. In general, module 72 receives as an input a raw engine power command ($P_{tot}$) 12 and performs on engine power command ($P_{tot}$) 12 the engine power command quantization with hysteresis process and the quantized engine power command filtering process to generate as an output a smoothed-out engine power command ($P_{tot\_final}$) 74. In both conventional architecture 10 and improved architecture 70, engine power command ($P_{tot}$) 12 is determined as the sum of driver power command 14 and battery power command 16. However, in improved architecture 70, smoothed-out engine power command ($P_{tot\_final}$) 74 as opposed to engine power command ($P_{tot}$) 12 is outputted to determine an engine torque command.

Quantization and filtering module 72 includes a quantizer 76 and a hysteresis logic 78. Quantizer 76 and hysteresis logic 78 perform on engine power command ($P_{tot}$) 12 the engine power command quantization with hysteresis process (described below with reference to FIG. 4) to generate as an output a quantized engine power command ($P_{tot\_quantized}$) 80.

Quantization and filtering module 72 further includes a filter 82. Filter 82 performs the quantized engine power command filtering process (described below with reference to FIG. 5) by smoothing out through low pass filtering the power difference ($\Delta P$) 84 between engine power command ($P_{tot}$) 12 and quantized engine power command ($P_{tot\_quantized}$) 80 to generate as an output a filtered power difference ($\Delta P_{filtered}$) 86. Quantized engine power command ($P_{tot\_quantized}$) 80 and filtered power difference ($\Delta P_{filtered}$) 86 are then summed to generate smoothed-out engine power command ($P_{tot\_final}$) 74, which is outputted from quantization and filtering module 72 for use in determining an engine torque command.

In smoothing out the power difference ($\Delta P$) 84 to generate filtered power difference ($\Delta P_{filtered}$) 86, filter 82 uses a filter constant (fk) 88 supplied by a filtering determination calculation table 90 of quantization and filtering module 72. As described in greater detail below, filter constant (fk) 88 is adaptively determined based on the amplitude of power difference ($\Delta P$) 84 and a fuel loss % ($\phi$) 92. Fuel loss % ($\phi$) 92 is calculated online based on the closed-loop feed back lambda ($\lambda$) A/F ratio.

Figure 4:
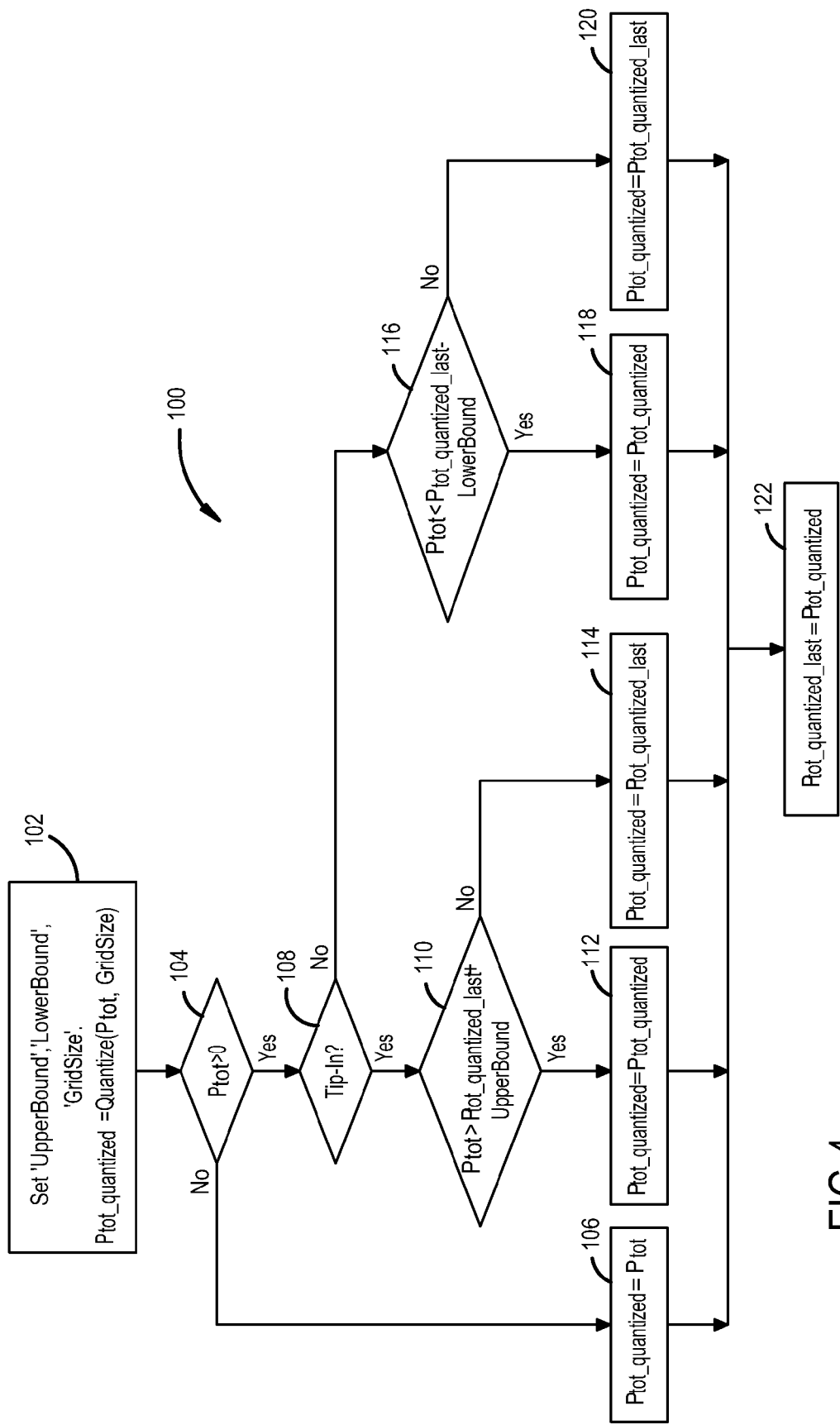
FIG. 4 illustrates a flowchart describing operation of the engine power command quantization with hysteresis process of the method of control for engine transient mitigation.
Figure 5:
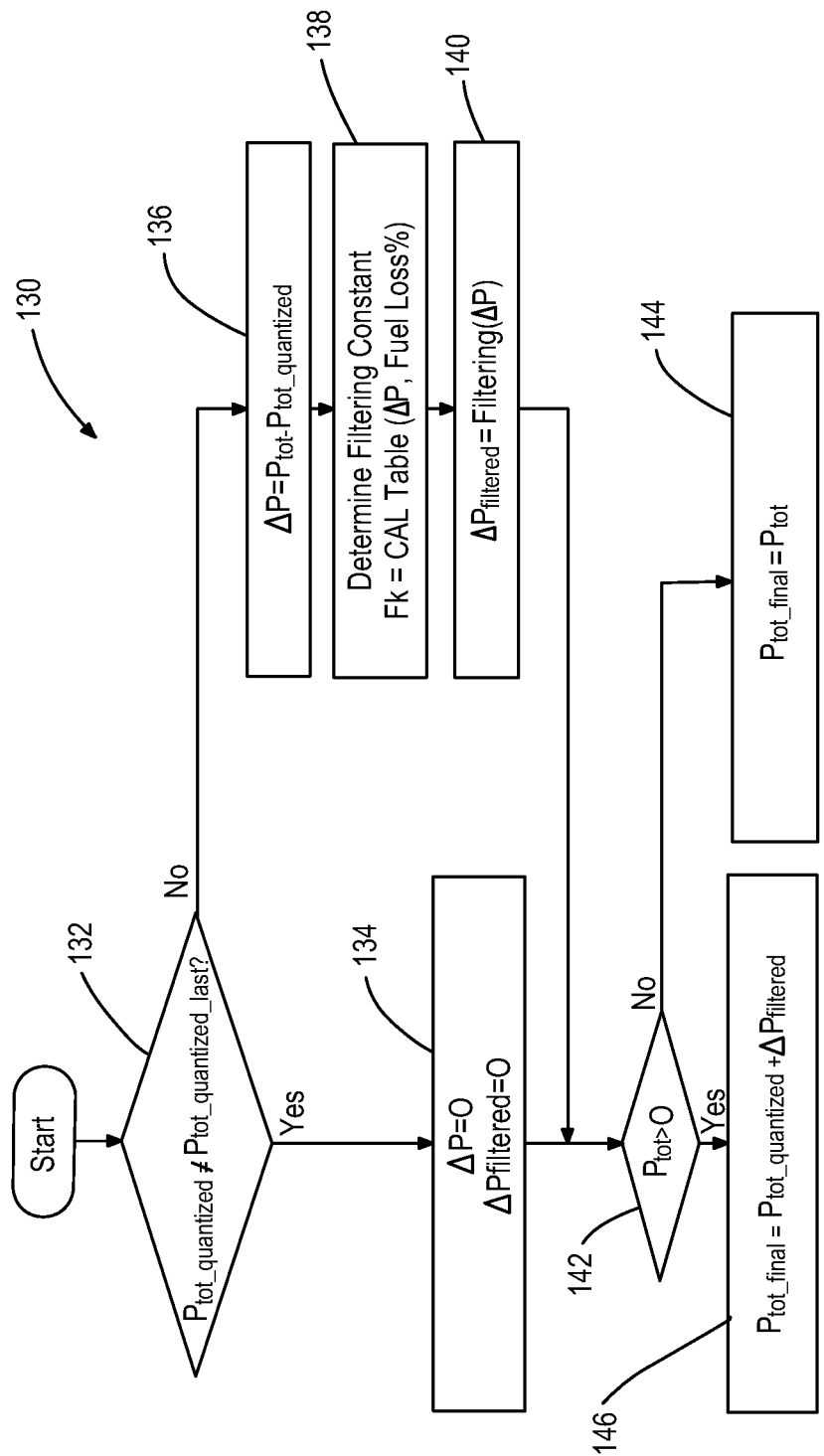
FIG. 5 illustrates a flowchart describing operation of the quantized engine power command filtering process of the method of control for engine transient mitigation.

FIGS. 4 and 5 illustrate flowcharts 100 and 130 respectively describing operation of the engine power command quantization with hysteresis process and the quantized engine power command filtering process of the method of control for engine transient mitigation.

As will be appreciated by one of ordinary skill in the art, flowcharts 100 and 130 represent control logic which may be implemented using hardware, software, or a combination thereof. For example, the various functions may be performed using a programmed microprocessor. The control logic may be implemented using any of a number of known programming or processing techniques or strategies and is not limited to the order of sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

The present invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Referring now to FIG. 4, with continual reference to improved architecture 70 shown in FIG. 3, flowchart 100 describing operation of the engine power command quantization with hysteresis process of the engine transient mitigation method is shown. This process is performed by quantizer 76 and hysteresis logic 78 of quantization and filtering module 72.

This process provides a power quantization flow designed to discretize raw engine power command ($P_{tot}$) 12 into predetermined (calibratable) grids. When engine power command ($P_{tot}$) 12 fluctuates within a unit power-grid step, the engine power command is maintained at a quantized constant level to eliminate any fast changes or dithering. For example, assuming the power quantization grid step size is 5 kW, any engine command ripple with a 'change amplitude' smaller than 5 kW will be filtered out. Instead, the battery power fills in the transient demand.

Hysteresis logic is embedded within the engine power command quantization with hysteresis process to prevent the quantized engine power command from unintended fast-switching between two adjacent quantization grids. During a tip-in event, at iteration n, only if the 'amplitude increase' of engine power command ($P_{tot}$) 12 exceeds the previous quantized engine power command (recorded from a previous iteration (n−1)) more than an upper-bound threshold, then the quantized engine power command will be updated accordingly. Otherwise, the quantized engine power command remains the same as the previous iteration. Similarly, a lower-bound threshold is used in the hysteresis logic for tip-out events.

The operation of the engine power command quantization with hysteresis process begins with 'UpperBound', "LowerBound', and 'GridSize' values being set in block 102. The gridsize value is indicative of the step size for each quantization grid. The upper-bound value is indicative of an engine power command 'amplitude increase' threshold for tip-in events. The lower-bound value is indicative of an engine power command 'amplitude decrease' threshold for tip-out events.

In block 102, during a current iteration 'n', quantizer 76 performs quantizes engine power command ($P_{tot}$) 12 as a function of the grid size to generate quantized engine power command ($P_{tot\_quantized}$) for current iteration 'n'.

In block 104, engine power command ($P_{tot}$) 12 is determined whether to be greater than zero. If no in block 104, then the outputted quantized engine power command ($P_{tot\_quantized}$) 80 is set to be engine power command ($P_{tot}$) 12 (i.e., $P_{tot\_quantized}=P_{tot}$) in block 106. If yes in block 104, then the process continues to block 108.

In block 108 it is determined whether there is a tip-in event. If yes in block 108, then hysteresis logic 78 determines if engine power command ($P_{tot}$) 12 is greater than the sum of the previous quantized engine power command ($P_{tot\_quantized\_last}$) (recorded by quantizer 76 during the previous iteration 'n-1') and the upper-bound value (i.e., $P_{tot} > P_{tot\_quantized\_last}$+UpperBound?) as shown in block 110. If yes in block 110, then the outputted quantized engine power command ($P_{tot\_quantized}$) 80 is set to be the quantized engine power command ($P_{tot\_quantized}$) generated in block 102 for the current iteration 'n' (i.e., $P_{tot\_quantized}=P_{tot\_quantized}$) as shown in block 112. If no in block 110, then the outputted quantized engine power command ($P_{tot\_quantized}$) 80 is set to be the previous quantized engine power command ($P_{tot\_quantized\_last}$) (i.e., $P_{tot\_quantized}=P_{tot\_quantized\_last}$) as shown in block 114.

Turning back to block 108, if no in block 108, thereby implying that there is a tip-out event, then hysteresis logic 78 determines if engine power command ($P_{tot}$) 12 is less than the difference of the previous quantized engine power command ($P_{tot\_quantized\_last}$) subtracted by the lower-bound value (i.e., $P_{tot} < P_{tot\_quantized\_last}$-LowerBound?) as shown in block 116. If yes in block 116, then the outputted quantized engine power command ($P_{tot\_quantized}$) 80 is set to be the quantized engine power command ($P_{tot\_quantized}$) generated in block 102 for the current iteration 'n' (i.e., $P_{tot\_quantized}=P_{tot\_quantized}$) as shown in block 118. If no in block 116, then the outputted quantized engine power command ($P_{tot\_quantized}$) 80 is set to be the previous quantized engine power command ($P_{tot\_quantized\_last}$) (i.e. $P_{tot\_quantized}=P_{tot\_quantized\_last}$) as shown in block 120.

Finally, in block 122, the previous quantized engine power command ($P_{tot\_quantized\_last}$) is updated to be the outputted quantized engine power command ($P_{tot\_quantized}$) 80 (obtained from the applicable one of blocks 106, 112, 114, 118, and 120 for the current iteration) (i.e., $P_{tot\_quantized\_last} = P_{tot\_quantized}$). In turn, the updated previous quantized engine power command is used for the subsequent iteration (i.e., n+1) of engine power command ($P_{tot}$) 12 at a succeeding point of time.

Referring now to FIG. 5, with continual reference to improved architecture 70 shown in FIG. 3, flowchart 130 describing operation of the quantized engine power command filtering process of the engine transient mitigation method is shown. This process is performed by filter 82 of quantization and filtering module 72.

Initially, filter 82 has access to outputted quantized engine power command ($P_{tot\_quantized}$) 80 and the previous quantized engine power command ($P_{tot\_quantized\_last}$). As indicated above with reference to FIG. 3, filter 82 receives as an input the power difference ($\Delta P$) 84 between engine power command ($P_{tot}$) 12 and outputted quantized engine power command ($P_{tot\_quantized}$) 80 (i.e., $\Delta P = P_{tot} - P_{tot\_quantized}$). Filter 82 also receives as an input the filter constant (fk) 88 supplied by filtering determination calculation table 90.

The operation of the quantized engine power command filtering process begins with filter 82 determining whether outputted quantized engine power command ($P_{tot\_quantized}$) 80 and the previous quantized engine power command ($P_{tot\_quantized\_last}$) have a different value (i.e., $P_{tot\_quantized} \ne P_{tot\_quantized\_last}$) as shown in block 132. If outputted quantized engine power command ($P_{tot\_quantized}$) 80 and the previous quantized engine power command ($P_{tot\_quantized\_last}$) have a difference value, then filter 82 resets power difference ($\Delta P$) 84 to zero and sets a filtered power difference ($\Delta P_{filtered}$) 86 to be zero (i.e., $\Delta P=0$ and $\Delta P_{filtered}=0$) as shown in block 134. If outputted quantized engine power command ($P_{tot\_quantized}$) 80 and the previous quantized engine power command ($P_{tot\_quantized\_last}$) have the same value, then filter 82 sets power difference ($\Delta P$) 84 to be the difference between engine power command ($P_{tot}$) 12 and outputted quantized engine power command ($P_{tot\_quantized}$) 80 (i.e., $\Delta P = P_{tot} - P_{tot\_quantized}$) in block 136. In block 138, filter 82 obtains the filtering constant (fk). In block 140, filter 84 filters the power difference ($\Delta P$) obtained from block 136 as a function of the filtering constant (fk) to generate filtered power difference ($\Delta P_{filtered}$) 86.

Upon completion of block 134 or block 140, filter 84 outputs filtered power difference ($\Delta P_{filtered}$) 86 to a summation segment 94 of quantization and filtering module 72. The outputted filtered power difference ($\Delta P_{filtered}$) 86 is zero if outputted from block 134. The outputted filtered power difference ($\Delta P_{filtered}$) 86 is the power difference ($\Delta P$) obtained from block 136 filtered as a function of the filtering constant (fk) if outputted from block 140.

The process from both blocks 134 and 140 continues to block 142 where it is determined whether engine power command ($P_{tot}$) 12 is greater than zero (i.e., $P_{tot}>0$?). If no, then engine power command ($P_{tot\_final}$) 74, which will be outputted from quantization and filtering module 72, is set to be engine power command ($P_{tot}$) 12 (i.e., $P_{tot\_final}=P_{tot}$) as shown in block 144. If yes, then engine power command ($P_{tot\_final}$) 74, which again will be outputted from quantization and filtering module 72, is set to be the sum of quantized engine power command ($P_{tot\_quantized}$) 80 and filtered power difference ($\Delta P_{filtered}$) 86 (i.e., $P_{tot\_final} = P_{tot\_quantized} + \Delta P_{filtered}$) as shown in block 146. Again, summation segment 94 of quantization and filtering module 72 sums quantized engine power command ($P_{tot\_quantized}$) 80 and filtered power difference ($\Delta P_{filtered}$) 86 and then outputs engine power command ($P_{tot\_final}$) 74, which is the sum of these two variables.

As shown in FIG. 3, quantization and filtering module 72 provides engine power command ($P_{tot\_final}$) 74 to a VCS 96 (e.g., another part of controller 60). VCS 96 determines an optimal engine torque command for engine 30 based on engine power command ($P_{tot\_final}$) 74. Quantization and filtering module 72 may also provide engine power command ($P_{tot\_final}$) 74 to a EOMS 98 (e.g., another part of controller 60). EOMS 98 determines an engine speed command based on engine power command ($P_{tot\_final}$) 74.

The design rationale of filtering determination calculation table 90 will now be explained in greater detail. When the power difference ($\Delta P$) is small, a fast filtering is applied. That means that a small amplitude of engine power command variation is allowed to some extent as it is less influential in triggering combustion transients. When the power difference ($\Delta P$) is large, a slow filtering is applied so that large command fluctuations and abrupt changes are heavily smoothed in open-loop to mitigate potential combustion inefficiency. On the other hand, the higher the fuel loss % ($\phi$), the slower the filtering is needed to further suppress fast transients. Such a closed-loop mechanism guarantees smooth engine power as soon as a big enrichment A/F error is detected.

It is noted that a reset is applied to the power difference ($\Delta P$) and the filtered power difference ($\Delta P_{filtered}$) (block 134 of FIG. 5) if $P_{tot\_quantized} \neq P_{tot\_quantized\_last}$ which indicates there is a truly desired engine power change from the driver. Therefore, the outputted engine power command ($P_{tot\_final}$) is allowed to jump to a new point on the quantized power grid.

In sum, after quantization and filtering of the inputted engine power command ($P_{tot}$) 12, the final outputted profiled engine power command ($P_{tot\_final}$) 74 is determined as the sum of quantized engine power command ($P_{tot\_quantized}$) 80 and filtered power difference ($\Delta P_{filtered}$) 86 (i.e., $P_{tot\_final} = P_{tot\_quantized} + \Delta P_{filtered}$).

Figure 6:
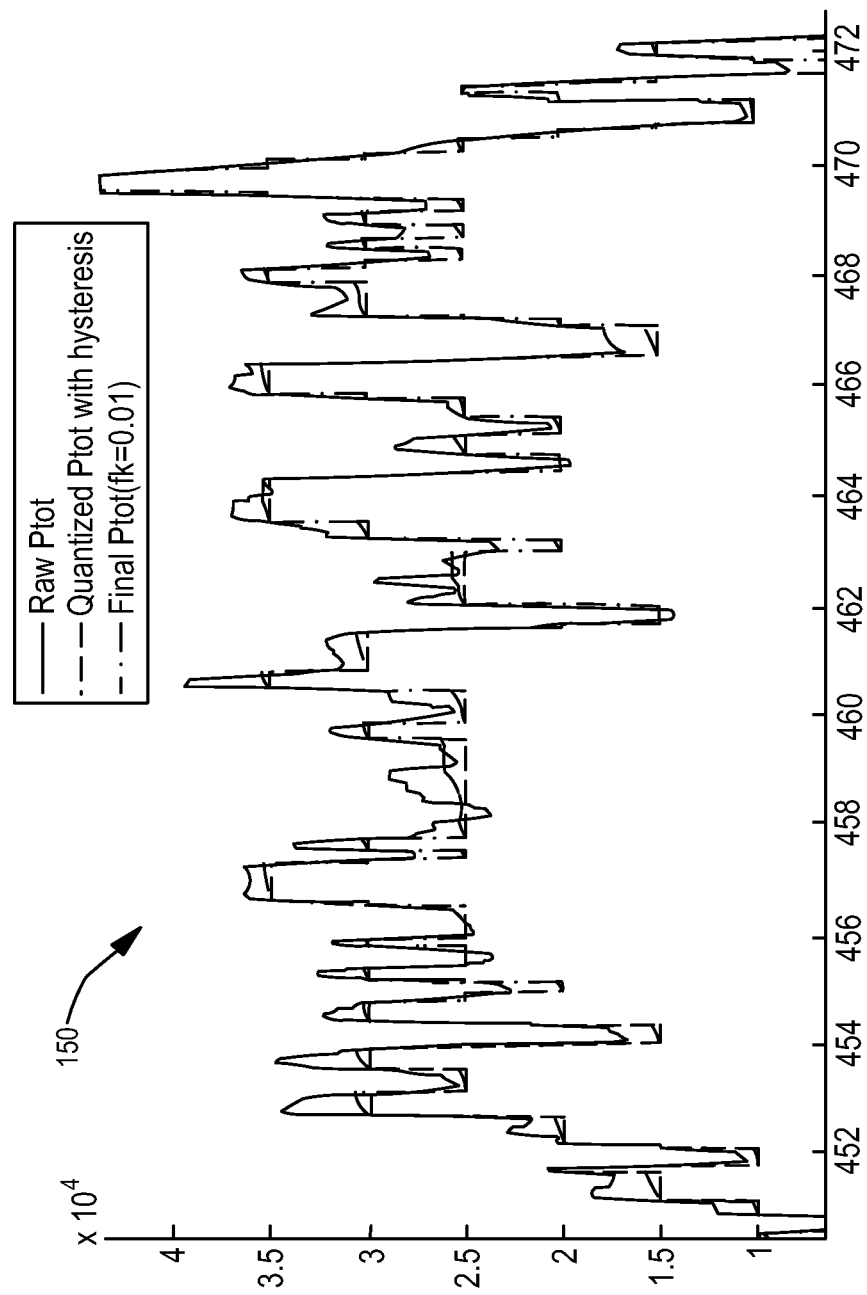
FIG. 6 illustrates a graphical representation illustrating simulation results of the method of control for engine transient mitigation.

Referring now to FIG. 6, a graphical representation 150 illustrating simulation results of the method of control for engine transient mitigation is shown. Graphical representation 150 compares the 'raw engine power command' versus the 'final profiled engine power command' outputted from quantization and filtering module 72. As indicated in graphical representation 150, the engine transient mitigation method performed by quantization and filtering module 72 has effectively screened out all engine power 'ripples' and 'fast fluctuations'. In addition, the engine transient mitigation method does not interfere with a truly desired 'quick engine power change' due to the built-in quantization hysteresis logic. Depending on the power quantization grid-size and the filter constants scheduling, this profiling process can be optimally calibrated to fit the engine combustion characteristics.

Benefits provided by the engine transient mitigation method may include: smooth out engine operations and eliminate unnecessary engine combustion transients in open-loop to benignly mitigate A/F enrichments; use battery to absorb driver power's 'perturbation' and deal with driver power's high frequency and chaotic component; and adaptively optimize engine power between 'load-leveling' and 'load-following' to further improve fuel economy.

While the best mode for carrying out the present invention has been described in detail, those familiar with the art to which this present invention relates will recognize various alternative designs and embodiments for practicing the present invention as defined by the following claims.

What is claimed:

1. A method of operating a hybrid vehicle having an engine and a secondary power source, the method comprising:
    obtaining a quantized previous engine power command based on a previous engine power command;
    quantizing a current engine power command;
    maintaining the quantized current engine power command if the magnitude of the difference between the current engine power command and the quantized previous engine power command is larger than a threshold;
    setting the quantized current engine power command equal to the quantized previous engine power command if the magnitude of the difference between the current engine power command and the quantized previous engine power command is smaller than the threshold;
    generating an output engine power command based on the quantized current engine power command; and
    operating the engine based on the output engine power command.

2. The method of claim 1 wherein:
    generating the output engine power command includes generating the output engine power command to be equal to the quantized current engine power command if the quantized current engine power command was maintained.

3. The method of claim 1 further comprising in the event of the quantized current engine power command being set equal to the quantized previous engine power command:
    determining a power difference between the current engine power command and the quantized current engine power command; and
    filtering the power difference as a function of the magnitude of the power difference to generate a filtered power difference;
    wherein generating the output engine power command includes generating the output engine power command equal to the sum of the quantized current engine power command and the filtered power difference.

4. The method of claim 3 wherein:
    the filtering rate is inversely proportional to the magnitude of the power difference.

5. The method of claim 3 wherein:
    filtering the power difference further includes filtering the power difference as a function of the magnitude of the power difference and a fuel loss factor of the engine to generate the filtered power difference.

6. The method of claim 5 wherein:
    the filtering rate is inversely proportional to the magnitude of the power difference;
    wherein the filtering rate is proportional to the fuel loss factor of the engine.

7. The method of claim 1 further comprising:
    during a tip-in event, maintaining the quantized current engine power command if the current engine power command is larger than the sum of the quantized previous engine power command and a magnitude increase threshold;
    during a tip-in event, setting the quantized current engine power command equal to the quantized previous engine power command if the current engine power command is smaller than the sum of the quantized previous engine power command and the magnitude increase threshold.

8. The method of claim 1 further comprising:
    during a tip-out event, maintaining the quantized current engine power command if the current engine power command is smaller than the quantized previous engine power command subtracted by a magnitude decrease threshold;
    during a tip-out event, setting the quantized current engine power command equal to the quantized previous engine power command if the current engine power command is larger than the quantized previous engine power command subtracted by the magnitude decrease threshold.

9. The method of claim 1 wherein:
    the current engine power command is the sum of a driver power command and a secondary power source power command.

10. The method of claim 9 wherein the secondary power source is a battery, wherein:
    the secondary power source power command is a battery power command.

11. A hybrid vehicle comprising:
    an electrical machine;
    an engine and a secondary power source capable of supplying power to the electrical machine; and
    a controller configured to:
    obtain a quantized previous engine power command based on a previous engine power command;
    quantize a current engine power command;
    maintain the quantized current engine power command if the magnitude of the difference between the current engine power command and the quantized previous engine power command is larger than a threshold;
    set the quantized current engine power command equal to the quantized previous engine power command if the magnitude of the difference between the current engine power command and the quantized previous engine power command is smaller than the threshold;

generate an output engine power command based on the quantized current engine power command; and operate the engine based on the output engine power command.

12. The hybrid vehicle of claim 11 wherein:

the controller is further configured to generate the output engine power command to be equal to the quantized current engine power command if the quantized current engine power command was maintained.

13. The hybrid vehicle of claim 11 wherein:

in the event of the quantized current engine power command being set equal to the quantized previous engine power command the controller is further configured to determine a power difference between the current engine power command and the quantized current engine power command and filter the power difference as a function of the magnitude of the power difference to generate a filtered power difference;

wherein the controller is further configured to generate the output engine power command to be equal to the sum of the quantized current engine power command and the filtered power difference.

14. The hybrid vehicle of claim 13 wherein:

the controller is further configured to filter the power difference as a function of the magnitude of the power difference and a fuel loss factor of the engine to generate the filtered power difference.

15. The hybrid vehicle of claim 11 wherein:

the controller is further configured to maintain the quantized current engine power command if the current engine power command is larger than the sum of the quantized previous engine power command and a magnitude increase threshold during a tip-in event;

the controller is further configured to set the quantized current engine power command equal to the quantized previous engine power command if the current engine power command is smaller than the sum of the quantized previous engine power command and the magnitude increase threshold during a tip-in event.

16. The hybrid vehicle of claim 11 wherein:

the controller is further configured to maintain the quantized current engine power command if the current engine power command is smaller than the quantized previous engine power command subtracted by a magnitude decrease threshold during a tip-out event;

the controller is further configured to set the quantized current engine power command equal to the quantized previous engine power command if the current engine power command is larger than the quantized previous engine power command subtracted by the magnitude decrease threshold during a tip-out event.

17. The hybrid vehicle of claim 11 wherein:

the secondary power source is a battery;

wherein the current engine power command is the sum of a driver power command and a battery power command.

18. A method comprising:

obtaining a quantized previous power command based on a previous power command;

quantizing a current power command;

maintaining the quantized current power command if the magnitude between the current power command and the quantized previous power command is larger than a threshold and otherwise setting the quantized current power command equal to the quantized previous power command; and operating an engine of a hybrid vehicle based on the quantized current power command.

19. The method of claim 18 wherein:

operating an engine of a hybrid vehicle based on the quantized current power command includes operating the engine based on the quantized current power command irrespective of any power difference between the current power command and the quantized current power command if the quantized current power command was maintained.

20. The method of claim 18 wherein:

operating an engine of a hybrid vehicle based on the quantized current power command includes operating the engine based on the sum of the quantized current power command and a filtered power difference between the current power command and the quantized current power command if the quantized current command was set equal to the quantized previous power command.

* * * * *